(12) United States Patent
Tsuchizawa et al.

(10) Patent No.: US 10,981,623 B2
(45) Date of Patent: Apr. 20, 2021

(54) BICYCLE CONTROL DEVICE

(71) Applicant: Shimano Inc., Osaka (JP)

(72) Inventors: Yasuhiro Tsuchizawa, Osaka (JP); Hiroshi Matsuda, Osaka (JP); Takuya Katsuki, Osaka (JP)

(73) Assignee: Shimano Inc., Osaka (JP)

( * ) Notice: Subject to any disclaimer, the term of this patent is extended or adjusted under 35 U.S.C. 154(b) by 402 days.

(21) Appl. No.: 15/991,881

(22) Filed: May 29, 2018

(65) Prior Publication Data

US 2018/0362115 A1 Dec. 20, 2018

(30) Foreign Application Priority Data

Jun. 16, 2017 (JP) .............................. JP2017-118452

(51) Int. Cl.
*B62M 6/50* (2010.01)
*B62M 6/55* (2010.01)
*B62M 6/90* (2010.01)

(52) U.S. Cl.
CPC ................ *B62M 6/50* (2013.01); *B62M 6/55* (2013.01); *B62M 6/90* (2013.01)

(58) Field of Classification Search
CPC .. B62M 6/50; B62M 6/55; B62M 6/90; B60L 15/20; B60L 2200/12
See application file for complete search history.

(56) References Cited

U.S. PATENT DOCUMENTS

| 2013/0054068 | A1 | 2/2013 | Shoge | |
|---|---|---|---|---|
| 2013/0267376 | A1* | 10/2013 | Takachi | B62M 25/08 477/3 |
| 2014/0222268 | A1* | 8/2014 | Tsuchizawa | B60L 50/20 701/22 |
| 2015/0120119 | A1* | 4/2015 | Tauchi | B62M 6/45 701/22 |
| 2016/0121730 | A1 | 5/2016 | Fujita et al. | |
| 2017/0334514 | A1* | 11/2017 | Chen | B62M 6/55 |
| 2019/0299797 | A1* | 10/2019 | Hasumi | B60L 15/2045 |
| 2019/0308512 | A1* | 10/2019 | Hasumi | B60L 9/18 |

FOREIGN PATENT DOCUMENTS

| EP | 0 893 338 B1 | 9/2004 |
|---|---|---|
| EP | 2 377 713 A1 | 10/2011 |
| JP | 2623419 B2 | 4/1997 |
| JP | 9-123978 A | 5/1997 |

(Continued)

*Primary Examiner* — Dale Moyer
(74) *Attorney, Agent, or Firm* — Global IP Counselors, LLP

(57) ABSTRACT

A bicycle control device that easily maintains the ratio of the assist force generated by a motor to the human drive force input to a bicycle at a predetermined ratio includes an electronic controller that controls a transmission, which is configured to change the transmission ratio of the bicycle, and the motor, which assists propulsion of the bicycle. The electronic controller is configured to control the motor so that the ratio of the assist force generated by the motor to the human drive force inputted to the bicycle becomes equal to the predetermined ratio. The electronic controller is configured to control the transmission in correspondence with at least one of the output torque of the motor and the human drive force to maintain the predetermined ratio.

25 Claims, 5 Drawing Sheets

(56) References Cited

FOREIGN PATENT DOCUMENTS

| | | | |
|---|---|---|---|
| JP | 9-240568 | A | 9/1997 |
| JP | 11-34966 | A | 2/1999 |
| JP | 11-180376 | A | 7/1999 |
| JP | 2000-38187 | A | 2/2000 |
| JP | 2003-104278 | A | 4/2003 |
| JP | 2011-240919 | A | 12/2011 |
| JP | 2013-47085 | A | 3/2013 |
| JP | 2014-151745 | A | 8/2014 |
| JP | 2015-110402 | A | 6/2015 |
| JP | 2016-101761 | A | 6/2016 |
| JP | 6005110 | B2 | 9/2016 |

* cited by examiner

BICYCLE CONTROL DEVICE

CROSS-REFERENCE TO RELATED APPLICATIONS

This application claims priority to Japanese Patent Application No. 2017-118452, filed on Jun. 16, 2017. The entire disclosure of Japanese Patent Application No. 2017-118452 is hereby incorporated herein by reference.

BACKGROUND

Field of the Invention

The present invention generally relates to a bicycle control device.

Background Information

Japanese Patent No. 2623419 describes a bicycle control device that controls a motor so that the ratio of an assist force generated by a motor to human drive force input to a bicycle becomes equal to a predetermined ratio.

SUMMARY

In the above-described bicycle control device, there are cases in which the ratio of the assist force generated by the motor to the human drive force input to the bicycle does not become equal to the predetermined ratio because of the output characteristics of the motor.

One object of the present invention is to provide a bicycle control device that easily maintains the ratio of the assist force generated by the motor to the human drive force input to the bicycle at the predetermined ratio.

A bicycle control device according to a first aspect of the present disclosure includes an electronic controller configured to control a transmission configured to change a transmission ratio of a bicycle and a motor that assists propulsion of the bicycle. The electronic controller is configured to control the motor so that a ratio of an assist force generated by the motor to a human drive force inputted to the bicycle becomes equal to a predetermined ratio, and the electronic controller is configured to control the transmission in correspondence with at least one of an output torque of the motor and the human drive force to maintain the predetermined ratio. With the first aspect, in a case where the transmission ratio is changed, the load on the rider and the motor at the upstream side of the transmission differs before and after the change. Thus, the rotational speed of the crank and the human drive force change. The electronic controller controls the motor so that the ratio of the assist force generated by the motor to the human drive force becomes equal to the predetermined ratio. Thus, a change in the human drive force will change the output torque of the motor. By changing the transmission ratio in correspondence with one of the output torque of the motor and the human drive force so that the output torque of the motor will be in a range suitable for the output characteristics of the motor, the ratio of the auxiliary force generated by the motor to the human drive force input to the bicycle can easily be maintained at the predetermined ratio. In the description hereafter, the ratio of the auxiliary force generated by the motor to the human drive force input to the bicycle will hereafter be simply referred to as the ratio.

In accordance with a second aspect of the present disclosure, the bicycle control device according to the first aspect is configured so that the electronic controller is configured to control the transmission to lower the transmission ratio upon determining the output torque of the motor is greater than or equal to a first torque. With the second aspect, the transmission ratio is lowered to decrease the output torque of the motor and maintain the ratio at the predetermined ratio. Thus, the ratio can be easily maintained at the predetermined ratio.

In accordance with a third aspect of the present disclosure, the bicycle control device according to the second aspect is configured so that the electronic controller is configured to control the transmission to lower the transmission ratio upon determining the output torque of the motor is greater than or equal to the first torque and a first predetermined condition is satisfied in relation with a rotational speed of a crank of the bicycle. With the third aspect, by lowering the transmission ratio, situations are reduced in which the riding state of the bicycle in relation with the rotational speed of the crank is changed to an undesirable state.

In accordance with a fourth aspect of the present disclosure, in the bicycle control device according to the third aspect, the transmission is configured to change the transmission ratio in steps. Further, the electronic controller is configured to determine that the first predetermined condition is satisfied if an estimated value of the rotational speed of the crank of the bicycle is less than or equal to a predetermined first rotational speed for a case where the transmission ratio is changed to a transmission ratio that is one step lower than that is presently set. With the fourth aspect, by lowering the transmission ratio, situations are reduced in which the rotational speed of the crank becomes greater than the first rotational speed.

In accordance with a fifth aspect of the present disclosure, the bicycle control device according to any one of the second to fourth aspects is configured so that the electronic controller is configured to control the transmission to lower the transmission ratio upon determining the output torque of the motor is greater than or equal to the first torque and the transmission ratio is presently greater than a first transmission ratio. The fifth aspect restricts control that sets the transmission ratio to less than the first transmission ratio.

In accordance with a sixth aspect of the present disclosure, the bicycle control device according to any one of the second to fifth aspects is configured so that the electronic controller is configured to control the motor so that the output torque of the motor does not become greater than or equal to an upper limit torque that is greater than the first torque. With the sixth aspect, the motor can be controlled in a manner suitable for the output characteristics of the motor.

In accordance with a seventh aspect of the present disclosure, the bicycle control device according to any one of the second to sixth aspects is configured so that the electronic controller is configured to control the transmission to raise the transmission ratio upon determining the output torque of the motor is less than or equal to a second torque that is less than the first torque. With the seventh aspect, by raising the transmission ratio, the output torque of the motor can be increased to maintain the ratio at the predetermined ratio. Thus, the ratio can be easily maintained at the predetermined ratio.

In accordance with an eighth aspect of the present disclosure, the bicycle control device according to any one of the first to sixth aspects is configured so that the electronic controller is configured to control the transmission to raise the transmission ratio upon determining the output torque of the motor is less than or equal to a second torque. With the eighth aspect, by raising the transmission ratio, the output torque of the motor can be increased to maintain the ratio at the predetermined ratio. Thus, the ratio can be easily maintained at the predetermined ratio.

In accordance with a ninth aspect of the present disclosure, the bicycle control device according to the seventh or eighth aspect is configured so that the electronic controller is configured to control the transmission to raise the transmission ratio the output torque of the motor is less than or equal to the second torque and a second predetermined condition is satisfied in relation with a rotational speed of a crank of the bicycle. With the ninth aspect, by raising the transmission ratio, situations are reduced in which the riding state of the bicycle in relation with the rotational speed of the crank is changed to an undesirable state.

In accordance with a tenth aspect of the present disclosure, the bicycle control device according to the ninth aspect is configured so that the transmission is configured to change the transmission ratio in steps. Further, the electronic controller is configured to determine that the second predetermined condition is satisfied if an estimated value of the rotational speed of the crank of the bicycle is greater than or equal to a predetermined second rotational speed for a case where the transmission ratio is changed to a transmission ratio that is one step higher than the transmission ratio that is presently set. With the tenth aspect, by raising the transmission ratio, situations are reduced in which the rotational speed of the crank becomes less than the second rotational speed.

In accordance with an eleventh aspect of the present disclosure, the bicycle control device according to any one of the seventh to tenth aspects is configured so that the electronic controller is configured to control the transmission to raise the transmission ratio upon determining the output torque of the motor is less than or equal to the second torque and the transmission ratio is presently less than a second transmission ratio. The eleventh aspect restricts control that sets the transmission ratio to greater than the second transmission ratio.

In accordance with a twelfth aspect of the present disclosure, the bicycle control device according to any one of the seventh to eleventh aspects is configured so that the electronic controller is configured to control the motor so that the output torque of the motor does not become less than or equal to a lower limit value that is less than the second torque. With the twelfth aspect, the motor can be controlled in a manner suitable for the output characteristics of the motor.

In accordance with a thirteenth aspect of the present disclosure, the bicycle control device according to any one of the first to twelfth aspects is configured so that the electronic controller is configured to control the transmission to lower the transmission ratio upon determining the human drive force is greater than or equal to a first value. With the thirteenth aspect, by lowering the transmission ratio, the human drive force is easily decreased. Thus, the output torque of the motor can be decreased to maintain the ratio at the predetermined ratio. This allows the ratio to be easily maintained at the predetermined ratio.

In accordance with a fourteenth aspect of the present disclosure, the bicycle control device according to the thirteenth aspect is configured so that the electronic controller is configured to control the transmission to lower the transmission ratio upon determining the human drive force is greater than or equal to a first value and a third predetermined condition is satisfied in relation with a rotational speed of the crank of the bicycle. With the fourteenth aspect, by lowering the transmission ratio, situations are reduced in which the riding state of the bicycle in relation with the rotational speed of the crank is changed to an undesirable state.

In accordance with a fifteenth aspect of the present disclosure, in the bicycle control device according to the fourteenth aspect, the transmission is configured to change the transmission ratio in steps. Further, the electronic controller is configured to determine that the third predetermined condition is satisfied if an estimated value of the rotational speed of the crank of the bicycle is less than a predetermined third rotational speed for a case where the transmission ratio is changed to a transmission ratio that is one step lower than the transmission ratio that is presently set. With the fifteenth aspect, by lowering the transmission ratio, situations are reduced in which the rotational speed of the crank becomes greater than the third rotational speed.

In accordance with a sixteenth aspect of the present disclosure, the bicycle control device according to any one of the thirteenth to fifteenth aspects is configured so that the electronic controller is configured to control the transmission to lower the transmission ratio upon determining the human drive force is greater than or equal to the first value and the transmission ratio is presently greater than a third transmission ratio. The sixteenth aspect restricts control that sets the transmission ratio to less than the third transmission ratio.

In accordance with a seventeenth aspect of the present disclosure, the bicycle control device according to any one of the thirteenth to sixteenth aspects is configured so that the electronic controller is configured to control the transmission to raise the transmission ratio upon determining the human drive force is less than or equal to a second value that is less than the first value. With the seventeenth aspect, by raising the transmission ratio, the human drive force can easily be increased. Thus, the output torque of motor can be increased to maintain the ratio at the predetermined ratio. This allows the ratio to be easily maintained at the predetermined ratio.

In accordance with an eighteenth aspect of the present disclosure, the bicycle control device according to any one of the first to sixteenth aspects is configured so that the electronic controller is configured to control the transmission to raise the transmission ratio upon determining the human drive force is less than or equal to a second value. With the eighteenth aspect, by raising the transmission ratio, the human drive force can easily be increased. Thus, the output torque of motor can be increased to maintain the ratio at the predetermined ratio. This allows the ratio to be easily maintained at the predetermined ratio.

In accordance with a nineteenth aspect of the present disclosure, the bicycle control device according to the seventeenth or eighteenth aspect is configured so that the electronic controller is configured to control the transmission to raise the transmission ratio upon determining the human drive force is less than or equal to the second value and a fourth predetermined condition is satisfied in relation with a rotational speed of the crank of the bicycle. With the nineteenth aspect, by raising the transmission ratio, situations are reduced in which the riding state of the bicycle in relation with the rotational speed of the crank is changed to an undesirable state.

In accordance with a twentieth aspect of the present disclosure, in the bicycle control device according to the nineteenth aspect, the transmission is configured to change the transmission ratio in steps. Further, the electronic controller is configured to determine that the fourth predetermined condition is satisfied if an estimated value of the rotational speed of the crank of the bicycle is greater than or equal to a predetermined fourth rotational speed for a case where the transmission ratio is changed to a transmission ratio that is one step higher than the transmission ratio that is presently set. With the twentieth aspect, by lowering the transmission ratio, situations are reduced in which the rotational speed of the crank becomes less than the fourth rotational speed.

In accordance with a twenty-first aspect of the present disclosure, the bicycle control device according to any one of the seventeenth to twentieth aspects is configured to that the electronic controller is configured to control the transmission to raise the transmission ratio upon determining the human drive force is less than or equal to the second value and the transmission ratio is presently less than a fourth transmission ratio. The twenty-first aspect restricts control that sets the transmission ratio to greater than the fourth transmission ratio.

In accordance with a twenty-second aspect of the present disclosure, the bicycle control device according to any one of the first to twenty-first aspects is configured so that the electronic controller is configured to change the predetermined ratio in correspondence with a travel state of the bicycle. With the twenty-second aspect, the motor can be controlled in a manner suitable for the travel state of the bicycle.

In accordance with a twenty-third aspect of the present disclosure, the bicycle control device according to the twenty-second aspect further comprises a memory device that stores the travel state which includes at least one of the human drive force, a rotational speed of a crank of the bicycle, a vehicle speed of the bicycle, an acceleration of the bicycle, an inclination angle of the bicycle, a wind velocity, a road surface resistance, and a travel resistance. With the twenty-third aspect, the motor can be controlled in a manner suitable for at least one of the human drive force, the rotational speed of the crank of the bicycle, the vehicle speed of the bicycle, the acceleration of the bicycle, the inclination angle of the bicycle, the wind velocity, the road surface resistance, and the travel resistance.

The bicycle control device according to the present disclosure easily maintains the ratio of the assist force generated by the motor to the human drive force input to the bicycle at the predetermined ratio.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

First Embodiment

A bicycle 10 including a first embodiment of a bicycle control device 60 will now be described with reference to FIG. 1. The bicycle 10 can be a mountain bike, a road bike, or a city bike. Further, the bicycle 10 can be a tricycle or a cargo bike.

Figure 1:
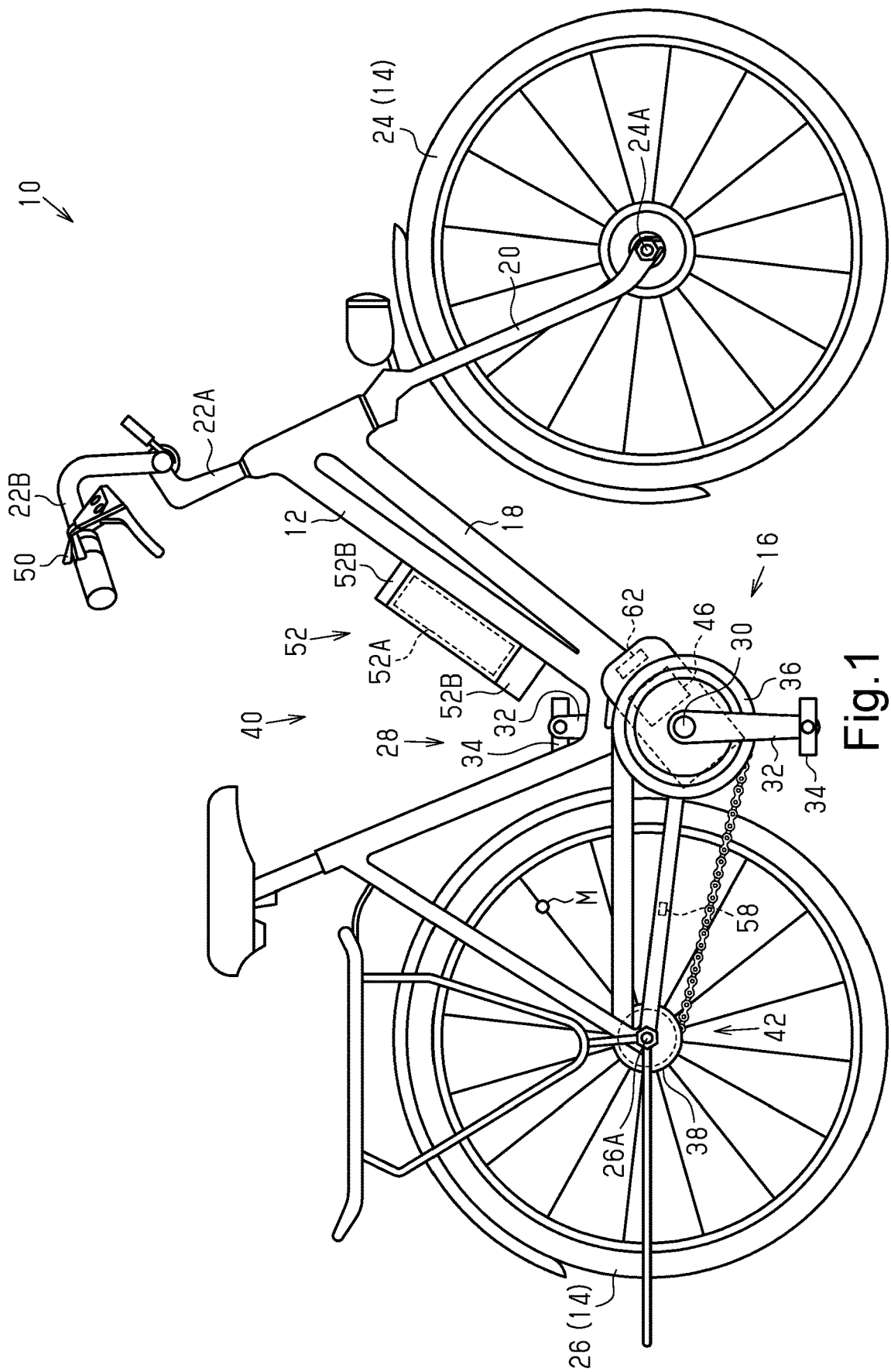
FIG. 1 is a side elevational view of a bicycle including a bicycle control device in accordance a first embodiment.

As shown in FIG. 1, the bicycle 10 includes a bicycle body 12, a pair of wheels 14, a drive mechanism 16 and a bicycle control system 40. The bicycle body 12 includes a frame 18, a front fork 20 and a handlebar 22B. The front fork 20 is connected to the frame 18. The handlebar 22B is attached by a stem 22A to the front fork 20 in a removable manner. The front fork 20 is supported by the frame 18.

The wheels 14 include a front wheel 24 and a rear wheel 26. The front wheel 24 includes an axle 24A connected to an end of the front fork 20. The rear wheel 26 includes an axle 26A connected to a rear end of the frame 18.

A drive mechanism 16 includes a crank 28 and a pair of pedals 34. The crank 28 includes a crankshaft 30 and a pair of crank arms 32. A drive mechanism 16 transmits human drive force (also called a manual force or a muscular force), which is applied to the pedals 34, to the rear wheel 26. The drive mechanism 16 includes a front rotation body 36 coupled to the crankshaft 30 by a one-way clutch. The one-way clutch functions to rotate the front rotation body 36 forward in a case where the crank 28 rotates forward and restrict rearward rotation of the front rotation body 36 in a case where the crank 28 rotates rearward. The front rotation body 36 can include a sprocket, a pulley or a bevel gear. The front rotation body 36 can be coupled to the crankshaft 30 without the one-way clutch. The drive mechanism 16 transmits the rotation of the crank 28 with, for example, a chain, a belt, or a shaft to a rear rotation body 38 that is coupled to the rear wheel 26. The rear rotation body 38 can include a sprocket, a pulley or a bevel gear. A one-way clutch is provided between the rear rotation body 38 and the rear wheel 26. The one-way clutch functions to rotate the rear wheel 26 forward in a case where the rear rotation body 38 rotates forward and restrict rearward rotation of the rear rotation body 38 in a case where the rear wheel 26 rotates rearward. At least one of the one-way clutch coupled to the front rotation body 36 and the one-way clutch coupled to the rear rotation body 38 can be omitted. The front rotation body 36 can include a plurality of front sprockets. The rear rotation body 38 can include a plurality of rear sprockets.

Figure 2:
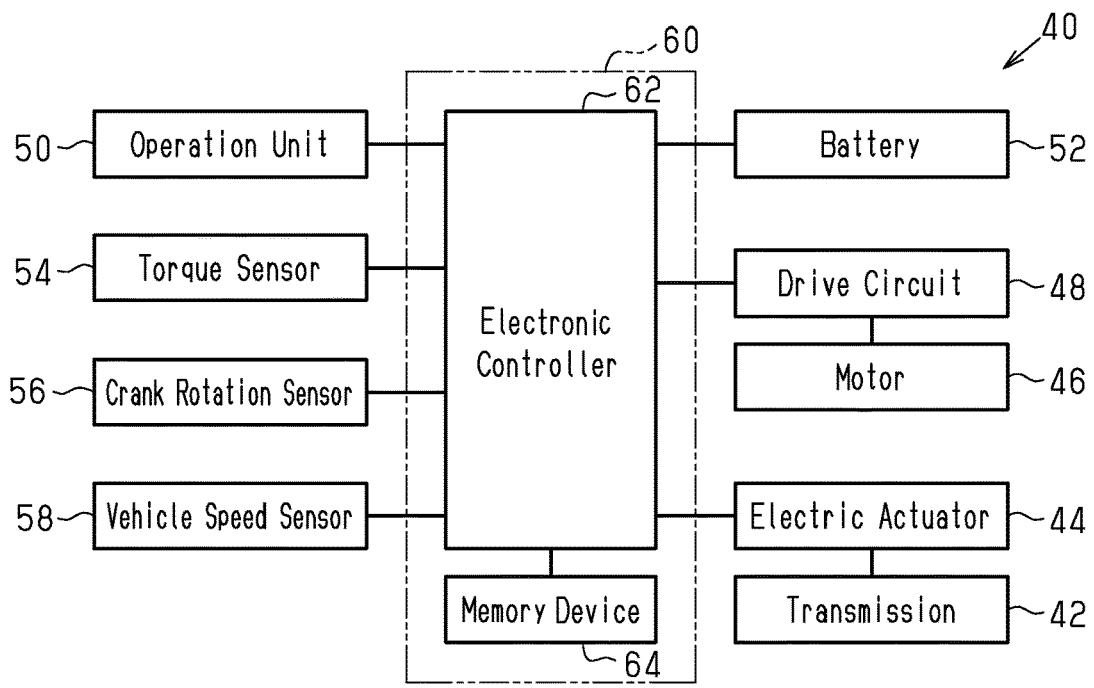
FIG. 2 is a block diagram illustrating the electrical configuration of the bicycle control device shown in FIG. 1.

As shown in FIG. 2, the bicycle control system 40 includes a transmission 42, an electric actuator 44, a motor 46, a drive circuit 48 of the motor 46, an operation unit 50, a battery 52, a torque sensor 54, a crank rotation sensor 56, a vehicle speed sensor 58 and a bicycle control device 60.

The transmission 42 is configured to change the transmission ratio R of the bicycle 10. The transmission 42 is configured to change the transmission ratio R in steps. The electric actuator 44 changes transmission ratios with the transmission 42. The transmission 42 is controlled by an electronic controller 62 of the bicycle control device 60. The electric actuator 44 can communicate with the electronic controller 62 through a wired connection or a wireless connection. The electric actuator 44 can communicate with the electronic controller 62 through, for example, Power Line Communication (PLC). The electric actuator 44 changes transmission ratios with the transmission 42 in accordance with control signals from the electronic controller 62. In one example, the transmission 42 changes the speed of the rotational input to the crankshaft 30 shown in FIG. 1 and then transmits the rotation to the rear wheel 26. In this case, the transmission 42 includes an internal transmission device. The internal transmission device is provided in the vicinity of the crankshaft 30 or in the hub of the rear wheel 26. The internal transmission device can be provided in a power transmission path between the crank 28 and the front rotation body 36. In another example, the transmission 42 uses a chain that shifts between front sprockets or rear sprockets to change the speed of the rotational input to the crankshaft 30 and transmit the rotation to the rear wheel. In this case, the transmission 42 includes an external transmission device (derailleur). The external transmission device includes one of a front external transmission device that shifts the chain between the front sprockets (not shown) and a rear external transmission device that shifts the chain between the rear sprockets (not shown). The electric actuator 44 includes an electric motor. The transmission 42 is driven by the electric actuator 44 to change transmission ratios so that the transmission ratio R of the bicycle 10 is changed in steps. In a case where the transmission 42 is an internal transmission device, the action for changing the transmission ratio includes an action that changes the connection of gears forming a planetary gear mechanism in the transmission 42. In a case where the transmission 42 is an external transmission device, the action for changing the transmission ratio includes shifting the chain between sprockets. The internal transmission device can include a Continuously Variable Transmission (CVT) mechanism. In one example, the CVT mechanism is formed by a planetary mechanism including an input body, an output body and a transmission body. The transmission body is rotated to continuously vary the transmission ratio R.

Preferably, the motor 46 and the drive circuit 48 shown in FIG. 2 are provided in the same housing (not shown). The drive circuit 48 controls the power supplied from the battery 52 to the motor 46. The drive circuit 48 can communicate with the electronic controller 62 through a wired connection or a wireless connection. The drive circuit 48 can communicate with the electronic controller 62 through, for example, serial communication. The drive circuit 48 drives the motor 46 in accordance with a control signal from the electronic controller 62. The motor 46 assists propulsion of the bicycle 10. The motor 46 includes an electric motor. The motor 46 is provided in a transmission path of the human drive force extending from the pedals 34 to the rear wheel 26 shown in FIG. 1 or provided to transmit rotation to the front wheel 24. The motor 46 is provided on the frame 18 of the bicycle 10, the rear wheel 26 or the front wheel 24. In one example, the motor 46 is connected to a power transmission path extending from the crankshaft 30 to the front rotation body 36. Preferably, the power transmission path between the motor 46 and the crankshaft 30 is provided with a one-way clutch (not shown) so that the rotational force of the crank 28 does not rotate the motor 46 in a case where the crankshaft 30 is rotated in a direction that moves the bicycle 10 forward. The motor 46 and the drive circuit 48 are provided in a housing that can accommodate elements other than the motor 46 and the drive circuit 48, for example, a reduction gear that reduces the speed of the rotation generated by the motor 46 and then outputs the rotation.

The operation unit 50 shown in FIG. 2 is operable by the user. The operation unit 50 is configured to change the mode of the motor 46 that assists propulsion of the bicycle 10. The changing of the mode of the motor 46 includes at least one of changing modes that differ from one another in the strength of the assist force that assists the human drive force and switching between an assist mode and a walk mode. The operation unit 50 is attached to the handlebar 22B of the bicycle 10 (refer to FIG. 1). The operation unit 50 includes, for example, an operation member, a sensor that detects movement of the operation member, and an electric circuit that performs communication with the electronic controller 62. The operation unit 50 can communicate with the electronic controller 62 through a wired connection or a wireless connection. The operation unit 50 can communicate with the electronic controller 62 through, for example, PLC. Operation of the operation unit 50 by the user results in the operation unit 50 transmitting an output signal to the electronic controller 62. The operation unit 50 includes one or more operation members used to change the mode of the motor 46. The operation members can be defined by push switches, lever-type switches or a touch panel.

The battery 52 includes a battery unit 52A that has one or more battery cells and a battery holder 52B that supports the battery unit 52A. The battery cell includes a rechargeable battery. The battery 52 is mounted on the bicycle 10 to supply power to other electric components electrically wire-connected to the battery 52, for example, the motor 46 and the bicycle control device 60. The battery 52 can communicated with the electronic controller 62 through a wired connection or a wireless connection. The battery 52 can communicate with the electronic controller 62 through, for example, PLC. The battery 52 can be coupled to the outside of the frame 18 or be at least partially accommodated inside the frame 18.

The torque sensor 54, which is shown in FIG. 2, outputs a signal corresponding to the human drive force TA. The torque sensor 54 detects the human drive force TA input to the drive mechanism 16 by the pedals 34 shown in FIG. 1. The torque sensor 54 can be provided in a transmission path of the human drive force TA between the crankshaft 30 and the front rotation body 36. The torque sensor 54 can be provided on the crankshaft 30 or the front rotation body 36. Alternatively, the torque sensor 54 can be provided on the crank arms 32 or the pedals 34. The functions of the torque sensor 54 can be accomplished by, for example, a strain sensor, an optical sensor, a pressure sensor, or the like. A strain sensor can be a strain gauge, a magnetostrictive sensor, or a piezoelectric sensor. Any sensor can be employed as the torque sensor 54 as long as it outputs a signal corresponding to the human drive force TA applied to the crank arms 32 or the pedals 34. The torque sensor 54 can communicate with the electronic controller 62 shown in FIG. 2 through a wired connection or a wireless connection. The torque sensor 54 outputs a signal corresponding to the human drive force TA to the electronic controller 62.

The crank rotation sensor 56 detects the rotational angle of the crank 28. The crank rotation sensor 56 is attached to the frame 18 of the bicycle 10 or the housing of the motor 46. The crank rotation sensor 56 is formed by a magnetic sensor that outputs a signal corresponding to the strength of a magnetic field. An annular magnet of which the magnetic field strength varies in the circumferential direction is provided on the crankshaft 30 or in a power transmission path between the crankshaft 30 and the front rotation body 36. The use of a magnetic sensor that outputs a signal corresponding to the magnetic field strength allows the rotational speed of the crank 28 and the rotational angle of the crank 28 to be detected with the same sensor. In addition to the rotational angle of the crank 28, the crank rotation sensor 56 can detect the rotational speed of the crank 28. The crank rotation sensor 56 can communicate with the electronic controller 62 through wired or wireless connection. The crank rotation sensor 56 outputs a signal corresponding to the rotational angle of the crank 28 to the electronic controller 62.

Instead of a magnetic sensor, the crank rotation sensor 56 can include an acceleration sensor provided on the crankshaft 30 or the crank arms 32. The output of the acceleration sensor includes the inclination angle of the acceleration sensor. The electronic controller 62 calculates the rotational angle of the crank 28 in correspondence with the inclination angle of the acceleration sensor.

The crank rotation sensor 56 can be provided on a member that rotates integrally with the crankshaft 30 in a transmission path of the human drive force TA extending from the crankshaft 30 to the front rotation body 36. For example, in a case where a one-way clutch is not provided between the crankshaft 30 and the front rotation body 36, the crank rotation sensor 56 can be provided on the front rotation body 36.

The vehicle speed sensor 58 shown in FIG. 1 detects the rotational speed of the wheels 14. The vehicle speed sensor 58 is electrically wire-connected or wireless-connected to the electronic controller 62. The vehicle speed sensor 58 is attached to a chain stay of the frame. The vehicle speed sensor 58 can communicate with the electronic controller 62 through wire connection or wireless connection. The vehicle speed sensor 58 outputs a signal corresponding to a change in the position of a magnet M, which is attached to the rear wheel 26, relative to the vehicle speed sensor 58 to the electronic controller 62. The electronic controller 62 calculates the vehicle speed V of the bicycle 10 from the rotational speed of the wheels 14. Preferably, the vehicle speed sensor 58 includes a magnetic reed that forms a reed switch or a Hall element. The vehicle speed sensor 58 can be provided on the front fork 20 and configured to detect the magnet attached to the front wheel 24.

As shown in FIG. 2, the bicycle control device 60 includes the electronic controller 62. In one example, the bicycle control device 60 further includes a memory device 64. The electronic controller 62 includes a computer that executes a predetermined control program. The computer includes, for example, a Central Processing Unit (CPU) or a Micro Processing Unit (MPU). The electronic controller 62 can include one or more microcomputers. The electronic controller 62 further includes a timer. The term "electronic controller" as used herein refers to hardware that executes software programs. The memory device 64 stores various types of control programs and information used for various types of control processing. The memory device 64 includes, for example, a non-volatile memory and a volatile memory, and can includes a ROM (Read Only Memory) device, a RAM (Random Access Memory) device, a hard disk, a flash drive, etc. The memory device 64 is any computer storage device or any computer readable medium with the sole exception of a transitory, propagating signal. The electronic controller 62 and the memory device 64 are accommodated in, for example, the housing of the motor 46.

The electronic controller 62 controls the transmission 42 and the motor 46. The electronic controller 62 controls the motor 46 so that the ratio A of the auxiliary force generated by the motor 46 to the human drive force TA input to the bicycle 10 becomes equal to a predetermined ratio AX. When the assist mode includes two stages of assist modes, the predetermined ratio AX includes a first ratio A1 and a second ratio A2 that is less than the first ratio A1. The first ratio A1 corresponds to the predetermined ratio AX for the assist mode having the largest predetermined ratio AX. The second ratio A2 corresponds to the predetermined ratio AX for the assist mode having the smallest predetermined ratio AX. To maintain the predetermined ratio AX, the electronic controller 62 controls the transmission 42 in correspondence with at least one of the output torque TX of the motor 46 and the human drive force TA. The assist mode can include three or more stages of assist modes. In this case, in addition to the first ratio A1 and the second ratio A2, the predetermined ratio AX further includes one or more predetermined ratios AX in correspondence with the number of assist mode stages.

The electronic controller 62 changes the predetermined ratio AX in correspondence with signals from the operation unit 50. More specifically, in a case where a signal for changing to an assist mode having a large predetermined ratio AX is received from the operation unit 50 and the assist mode that is set has a predetermined ratio AX that is less than the first ratio A1, the electronic controller 62 changes the assist mode to a predetermined ratio AX that is one step higher. In a case where a signal for changing the assist mode to a mode having a smaller predetermined ratio AX is received from the operation unit 50 and the assist mode that is set has a predetermined ratio AX that is greater than the second ratio A2, the electronic controller 62 changes the assist mode to a mode having a predetermined ratio AX that is one step lower. In a case where the electronic controller 62 receives a signal for changing to a mode having a small predetermined ratio AX from the operation unit 50 and the predetermined ratio AX is the second ratio A2, the electronic controller 62 turns off the assist mode. In a state in which the assist mode is off and a signal for changing to a mode having a large predetermined ratio AX is received from the operation unit 50, the electronic controller 62 controls the motor 46 in the assist mode of which the predetermined ratio AX is the second ratio A2.

The electronic controller 62 changes the predetermined ratio AX in correspondence with the travel state of the bicycle 10. The travel state includes at least one of the human drive force TA, the rotational speed N of the crank 28 of the bicycle 10, the vehicle speed V of the bicycle 10, the acceleration of the bicycle 10, the inclination angle of the bicycle 10, the wind velocity, the road surface resistance and the travel resistance. The acceleration of the bicycle 10 is obtained by, for example, differentiating the vehicle speed V. The inclination angle of the bicycle 10 is obtained by, for example, providing an inclination sensor on the bicycle 10. The inclination angle of the bicycle 10 can be the road gradient obtained through a global positioning system (GPS) receiver, the Internet, and the like. The wind velocity is obtained by, for example, providing a wind velocity sensor on the bicycle 10. The road surface resistance is obtained by, for example, calculating the slip rate of the wheels 14 from the rotational speed N of the crank 28 and the vehicle speed V. The wind velocity and the road surface resistance can be obtained through a GPS receiver, the Internet, and the like. The travel resistance can be obtained by, for example, subtracting the kinetic energy of the bicycle 10 from the energy input to the bicycle 10. The energy input to the bicycle 10 is obtained from the rotational speed N of the crank 28 and at least one of the human drive force TA and the output torque TX of the motor 46. The kinetic energy of the bicycle 10 is obtained from the vehicle speed V of the bicycle 10 and the weight of the bicycle 10 and the rider.

Figure 3:
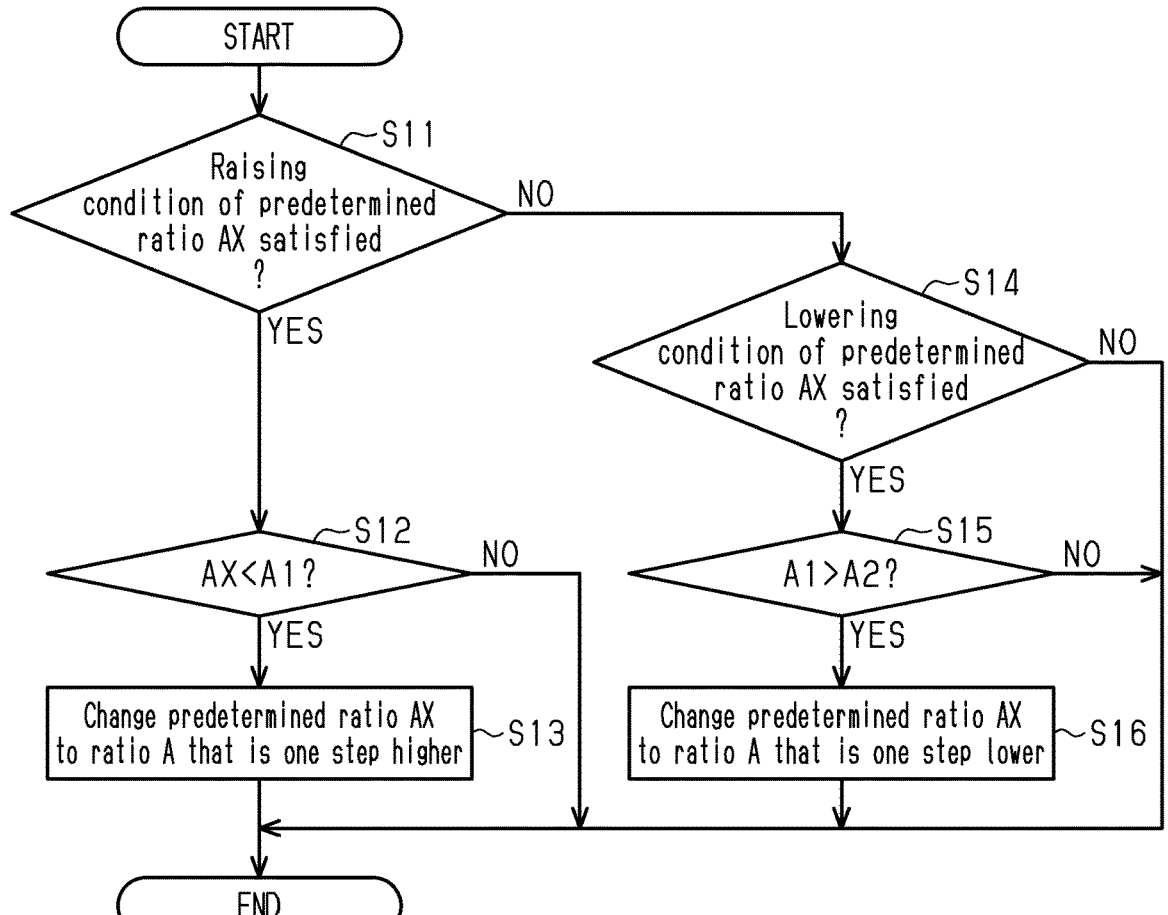
FIG. 3 is a flowchart of a control executed by an electronic controller shown in FIG. 2 to change a predetermined ratio.

With reference to FIG. 3, a control for changing the predetermined ratio AX will now be described. In a case where the assist mode is set upon operation of the operation unit 50, the electronic controller 62 starts processing and performs step S11 of the flowchart shown in FIG. 3. As long as the assist mode is set, the electronic controller 62 performs processing from step S11 in predetermined cycles.

In step S11, the electronic controller 62 determines whether or not a raising condition of the predetermined ratio AX has been satisfied. The raising condition of the predetermined ratio AX is satisfied based on at least one of the human drive force TA, the rotational speed N of the crank 28 of the bicycle 10, the vehicle speed V of the bicycle 10, the acceleration of the bicycle 10, the inclination angle of the bicycle 10, the wind velocity, the road surface resistance, and the travel resistance. The electronic controller 62 determines that the raising condition of the predetermined ratio AX has been satisfied, for example, in a case where at least one of the human drive force TA, the vehicle speed V of the bicycle 10, the acceleration of the bicycle 10, the inclination angle of the bicycle 10, the wind velocity, the road surface resistance, and the travel resistance is greater than a predetermined value. Further, the electronic controller 62 determines that the raising condition of the predetermined ratio AX has been satisfied, for example, in a case where the rotational speed N of the crank 28 of the bicycle 10 is less than a predetermined value.

In a case where the electronic controller 62 determines that the raising condition of the predetermined ratio AX has been satisfied, the electronic controller 62 proceeds to step S12 and determines whether or not the predetermined ratio AX is less than the first ratio A1. More specifically, the electronic controller 62 determines whether or not the assist mode is a mode corresponding to the first ratio A1. In a case where the electronic controller 62 determines that the predetermined ratio AX is less than the first ratio A1, the electronic controller 62 proceeds to step S13 and raises the predetermined ratio AX by one step. Then, the electronic controller 62 ends the processing. In a case where the electronic controller 62 determines in step S12 that the predetermined ratio AX is the first ratio A1, the electronic controller 62 ends processing without changing the predetermined ratio AX.

In a case where the electronic controller 62 determines in step S11 that the raising condition of the predetermined ratio AX has not been satisfied, the electronic controller 62 proceeds to step S14 and determines whether or not a lowering condition of the predetermined ratio AX has been satisfied. The lowering condition of the predetermined ratio AX is satisfied based on at least one of the human drive force TA, the rotational speed N of the crank 28 of the bicycle 10, the vehicle speed V of the bicycle 10, the acceleration of the bicycle 10, the inclination angle of the bicycle 10, the wind velocity, the road surface resistance, and the travel resistance. The electronic controller 62 determines that the lowering condition of the predetermined ratio AX has been satisfied, for example, in a case where at least one of the human drive force TA, the vehicle speed V of the bicycle 10, the acceleration of the bicycle 10, the inclination angle of the bicycle 10, the wind velocity, the road surface resistance, and the travel resistance is less than a predetermined value. Further, the electronic controller 62 determines that the lowering condition of the predetermined ratio AX has been satisfied, for example, in a case where the rotational speed N of the crank 28 of the bicycle 10 is greater than a predetermined value.

In a case where the electronic controller 62 determines that the lowering condition of the predetermined ratio AX has been satisfied, the electronic controller 62 proceeds to step S15 and determines whether or not the predetermined ratio AX is greater than the second ratio A2. More specifically, the electronic controller 62 determines whether or not the assist mode is a mode corresponding to the second ratio A2. In a case where the electronic controller 62 determines that the predetermined ratio AX is greater than the second ratio A2, the electronic controller 62 proceeds to step S16 and lowers the predetermined ratio AX by one step. Then, the electronic controller 62 ends the processing. In a case where the electronic controller 62 determines in step S15 that the predetermined ratio AX is the second ratio A2, the electronic controller 62 ends processing without changing the predetermined ratio AX.

The electronic controller 62 controls the motor 46 so that the output torque TX of the motor 46 does not become greater than or equal to an upper limit torque TY1 that is greater than a first torque TX1. The upper limit torque TY1 is determined in accordance with the characteristics of the motor 46. The electronic controller 62 controls the motor 46 so that the output torque TX of the motor 46 does not become less than or equal to a lower limit torque TY2 that is less than a second torque TX2. The second torque TX2 is less than the first torque TX1. The lower limit torque TY2 is determined in accordance with the characteristics of the motor 46. The first torque TX1 is set to a value that is approximate to the upper limit torque TY1. The first torque TX1 is closer to the upper limit torque TY1 than the median value between the upper limit torque TY1 and the lower limit torque TY2. The second torque TX2 is set to a value that is approximate to the lower limit torque TY2. The second torque TX2 is closer to the lower limit torque TY2 than the median value between the upper limit torque TY1 and the lower limit torque TY2.

In a case where the output torque TX of the motor 46 is greater than or equal to the first torque TX1, the electronic controller 62 controls the transmission 42 to lower the transmission ratio R. In a case where the output torque TX of the motor 46 is greater than or equal to the first torque TX1 and the transmission ratio R that is presently set is greater than a first transmission ratio R1, the electronic controller 62 controls the transmission ratio R to lower the transmission 42. The first transmission ratio R1 corresponds to, for example, the smallest transmission ratio R achievable by the transmission 42. In a case where the output torque TX of the motor 46 is greater than or equal to the first torque TX1 and a first predetermined condition is satisfied in relation with the rotational speed N of the crank 28 of the bicycle 10, the electronic controller 62 controls the transmission 42 to lower the transmission ratio R. The first predetermined condition is satisfied if an estimated value NX of the rotational speed N of the crank 28 of the bicycle 10 will be less than or equal to a predetermined first rotational speed N1 for a case where the transmission ratio R is changed to a transmission ratio R that is one step lower than the transmission ratio R that is presently set.

In a case where the output torque TX of the motor 46 is less than or equal to the second torque TX2, the electronic controller 62 controls the transmission 42 to raise the transmission ratio R. In a case where the output torque TX of the motor 46 is less than or equal to the second torque TX2 and the transmission ratio R that is presently set is less than a second transmission ratio R2, the electronic controller 62 controls the transmission 42 to raise the transmission ratio R. The second transmission ratio R2 corresponds to, for example, the largest transmission ratio R achievable by the transmission 42. In a case where the output torque TX of the motor 46 is less than or equal to the second torque TX2 and a second predetermined condition is satisfied in relation with the rotational speed N of the crank 28 of the bicycle 10, the electronic controller 62 controls the transmission 42 to raise the transmission ratio R. The second predetermined condition is satisfied if an estimated value NY of the rotational speed N of the crank 28 of the bicycle 10 will be greater than or equal to a second rotational speed N2 for a case where the transmission ratio R is changed to a transmission ratio R that is one step higher than the transmission ratio R that is presently set.

Figure 4:
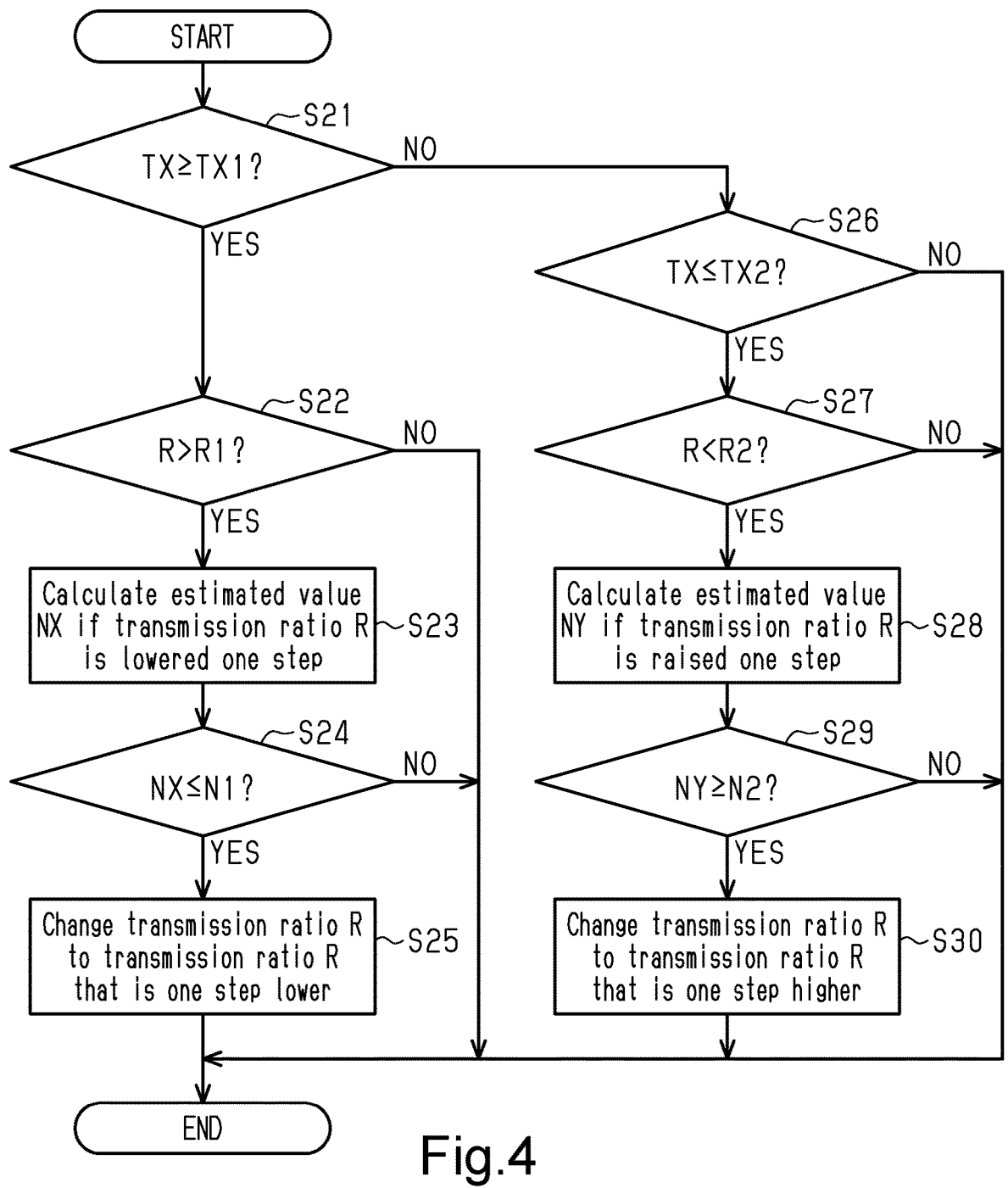
FIG. 4 is a flowchart of a control executed by the electronic controller shown in FIG. 2 to change a transmission ratio.

With reference to FIG. 4, a control for changing the transmission ratio R will now be described. In a case where the assist mode is set upon operation of the operation unit 50, the electronic controller 62 starts processing and performs step S21 of the flowchart shown in FIG. 4. As long as the assist mode is set, the electronic controller 62 performs processing from step S21 in predetermined cycles.

The electronic controller 62 determines in step S21 whether or not the output torque TX of the motor 46 is greater than or equal to the first torque TX1. When the electronic controller 62 determines that the output torque TX is greater than or equal to the first torque TX1, the electronic controller 62 proceeds to step S22 and determines whether or not the transmission ratio R is greater than the first transmission ratio R1. When the electronic controller 62 determines that the transmission ratio R is greater than the first transmission ratio R1, the electronic controller 62 proceeds to step S23 and calculates the estimated value NX of the rotational speed N of the crank 28 of the bicycle 10 for a case where the transmission ratio R is changed to a transmission ratio R that is one step lower than the transmission ratio R that is presently set. More specifically, the electronic controller 62 calculates the estimated value NX using at least one of a map, a table, and an equation stored beforehand in the memory device 64 and indicating the relationship of changes in the transmission ratio R with respect to the estimated value NX. The map, the table, and the equation indicating the relationship of changes in the transmission ratio R with respect to the estimated value NX can each include parameters such as the vehicle speed V and the human drive force TA. Then, in step S24, the electronic controller 62 determines whether or not the estimated value NX is less than or equal to the first rotational speed N1.

In a case where the electronic controller 62 determines in step S24 that the estimated value NX is less than or equal to the first rotational speed N1, the electronic controller 62 proceeds to step S25 and controls the transmission 42 to change the transmission ratio R to a transmission ratio R that is one step lower. Then, the electronic controller 42 ends processing. In a case where the electronic controller 62 determines in step S24 that the estimated value NX is greater than the first rotational speed N1, the electronic controller 42 ends processing without changing the transmission ratio R.

In a case where the electronic controller 62 determines in step S21 that the output torque TX is less than the first torque TX1, the electronic controller 62 proceeds to step S26. The electronic controller 62, in step S26, determines whether or not the output torque TX of the motor 46 is less than or equal to the second torque TX2. In a case where the electronic controller 62 determines that the output torque TX is less than or equal to the second torque TX2, the electronic controller 62 proceeds to step S27 and determines whether or not the transmission ratio R is less than the second transmission ratio R2. In a case where the electronic controller 62 determines that the transmission ratio R is less than the second transmission ratio R2, the electronic controller 62 proceeds to step S28 and calculates the estimated value NY of the rotational speed N of the crank 28 of the bicycle 10 for a case where the transmission ratio R is changed to a transmission ratio R that is one step higher than the transmission ratio R that is presently set. More specifically, the electronic controller 62 calculates the estimated value NY using at least one of a map, a table, and an equation stored beforehand in the memory device 64 and indicating the relationship of changes in the transmission ratio R with respect to the estimated value NY. The map, the table, and the equation indicating the relationship of changes in the transmission ratio R with respect to the estimated value NY can each include parameters such as the vehicle speed V and the human drive force TA. Then, in step S29, the electronic controller 62 determines whether or not the estimated value NY is greater than or equal to the second rotational speed N2.

In a case where the electronic controller 62 determines in step S29 that the estimated value NY is greater than or equal to the second rotational speed N2, the electronic controller 62 proceeds to step S30 and controls the transmission 42 to change the transmission ratio R to a transmission ratio R that is one step higher. Then, the electronic controller 62 ends processing. In a case where the electronic controller 62 determines in step S29 that the estimated value NY is less than the second rotational speed N2, the electronic controller 62 ends processing without changing the transmission ratio R.

In a case where the electronic controller 62 determines in step S26 that the output torque TX of the motor 46 is greater than the second torque TX2, the electronic controller 62 ends processing. In a case where a negative determination is made in step S21 and a negative determination is made in step S26 indicating that the output torque TX of the motor 46 is in a range less than the first torque TX1 and greater than the second torque TX2, the transmission ratio R is not changed.

Second Embodiment

Figure 5:
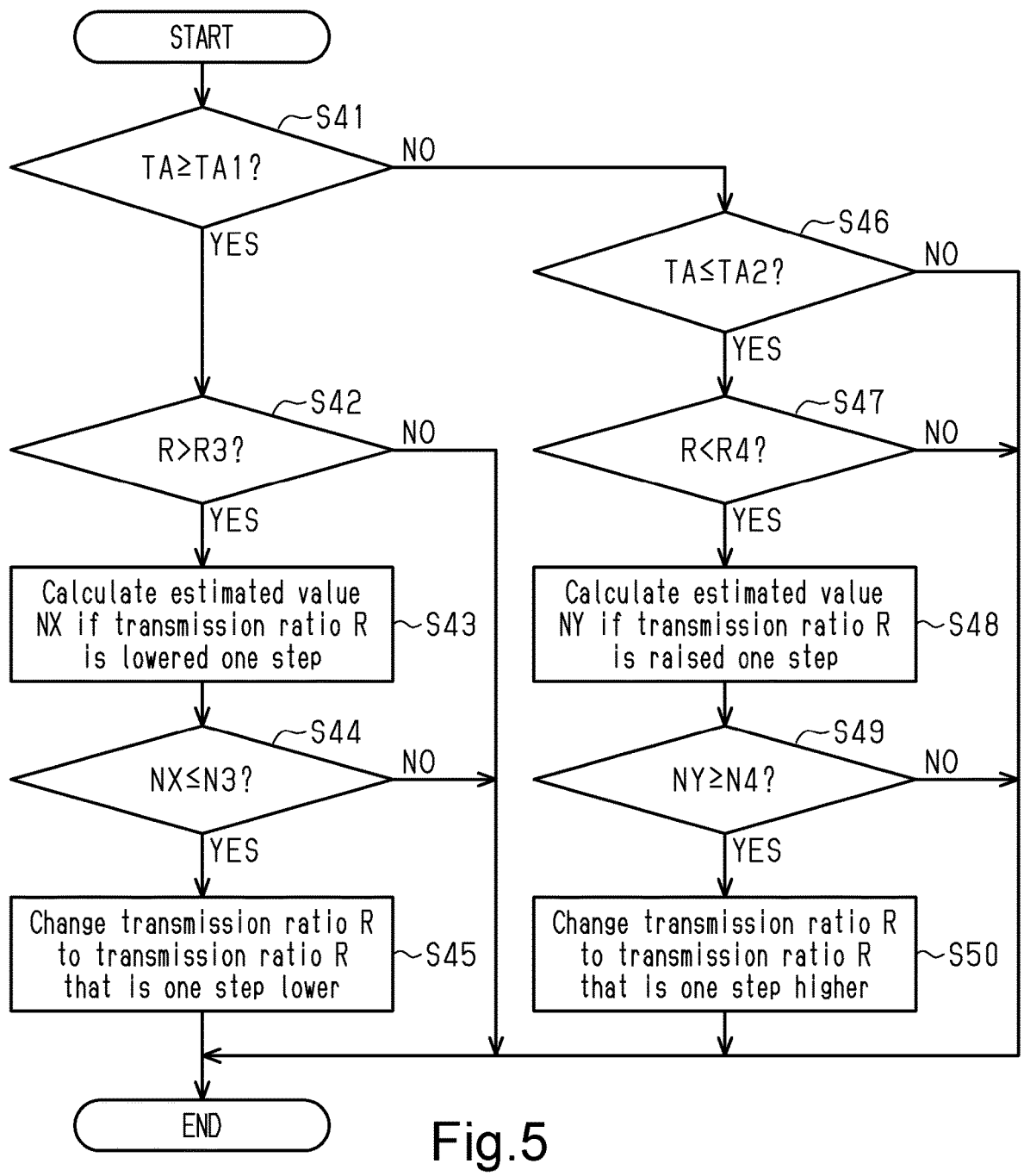
FIG. 5 is a flowchart of a control executed by an electronic controller to change the transmission ratio in accordance a second embodiment.

With reference to FIGS. 2 and 5, a second embodiment of the bicycle control device 60 will now be described. The second embodiment of the bicycle control device 60 is similar to first embodiment of the bicycle control device 60 except in that the human drive force TA is used instead of the output torque TX of the motor 46 in the control for changing the transmission ratio R. Thus, same reference numerals are given to those components that are the same as the corresponding components of the first embodiment. Such components will not be described in detail.

In a case where the human drive force TA is greater than or equal to a first value TA1, the electronic controller 62 controls the transmission 42 to lower the transmission ratio R. In a case where the human drive force TA is greater than or equal to the first value TA1 and the transmission ratio R that is presently set is greater than the third transmission ratio R3, the electronic controller 62 controls the transmission 42 to lower the transmission ratio R. The third transmission ratio R3 corresponds to the smallest transmission ratio R achievable by the transmission 42. In a case where the human drive force TA is greater than or equal to the first value TA1 and a third predetermined condition is satisfied in relation with the rotational speed N of the crank 28 of the bicycle 10, the electronic controller 62 controls the transmission 42 to lower the transmission ratio R. The third predetermined condition is satisfied if the estimated value NX of the rotational speed N of the crank 28 of the bicycle 10 will be less than or equal to a predetermined third rotational speed N3 for a case where the transmission ratio R is changed to a transmission ratio R that is one step lower than the transmission ratio R that is presently set.

In a case where the human drive force TA is less than or equal to a second value TA2 that is less than the first value TA1, the electronic controller 62 controls the transmission 42 to raise the transmission ratio R. In a case where the human drive force TA is less than or equal to the second value TA2 and the transmission ratio R that is presently set is less than the fourth transmission ratio R4, the electronic controller 62 controls the transmission 42 to raise the transmission ratio R. The fourth transmission ratio R4 corresponds to the largest transmission ratio R achievable by the transmission 42. In a case where the human drive force TA is less than or equal to the second value TA2 and a fourth predetermined condition is satisfied in relation with the rotational speed N of the crank 28 of the bicycle 10, the electronic controller 62 controls the transmission 42 to raise the transmission ratio R. The fourth predetermined condition is satisfied if the estimated value NY of the rotational speed N of the crank 28 of the bicycle 10 will be greater than a predetermined fourth rotational speed N4 for a case where the transmission ratio R is changed to a transmission ratio R that is one step higher than the transmission ratio R that is presently set.

With reference to FIG. 5, a control for changing the transmission ratio R will now be described. In a case where the assist mode is initiated upon operation of the operation unit 50, the electronic controller 62 starts processing and performs step S41 of the flowchart shown in FIG. 5. As long as the assist mode is performed, the electronic controller 62 performs processing from step S41 in predetermined cycles.

In step S41, the electronic controller 62 determines whether or not the human drive force TA is greater than or equal to the first value TA1. In a case where the electronic controller 62 determines that the human drive force TA is greater than or equal to the first value TA1, the electronic controller 62 proceeds to step S42 and determines whether or not the transmission ratio R is greater than the third transmission ratio R3. In a case where the electronic controller 62 determines that the transmission ratio R is greater than the third transmission ratio R3, the electronic controller 62 proceeds to step S43 and calculates the estimated value NX of the rotational speed N of the crank 28 of the bicycle 10 for a case where the transmission ratio R is changed to a transmission ratio R that is one step lower than the transmission ratio R that is presently set. More specifically, the electronic controller 62 calculates the estimated value NX using at least one of a map, a table, and an equation stored beforehand in the memory device 64 and indicating the relationship of changes in the transmission ratio R with respect to the estimated value NX. The map, the table, and the equation indicating the relationship of changes in the transmission ratio R with respect to the estimated value NX can each include parameters such as the vehicle speed V and the human drive force TA. Then, in step S44, the electronic controller 62 determines whether or not the estimated value NX is less than or equal to the third rotational speed N3.

In a case where the electronic controller 62 determines in step S44 that the estimated value NX is less than or equal to the third rotational speed N3, the electronic controller 62 proceeds to step S45 and controls the transmission 42 to change the transmission ratio R to a transmission ratio R that is one step lower. Then, the electronic controller 62 ends processing. In a case where the electronic controller 62 determines in step S44 that the estimated value NX is greater than the third rotational speed N3, the electronic controller 62 ends processing without changing the transmission ratio R.

In a case where the electronic controller 62 determines in step S41 that the human drive force TA is less than the first value TA1, the electronic controller 62 proceeds to step S46. The electronic controller 62 determines in step S46 whether or not the human drive force TA is less than or equal to the second value TA2. In a case where the electronic controller 62 determines that the human drive force TA is less than or equal to the second value TA2, the electronic controller 62 proceeds to step S47 and determines whether or not the transmission ratio R is less than the fourth transmission ratio R4. In a case where the electronic controller 62 determines that the transmission ratio R is less than the fourth transmission ratio R4, the electronic controller 62 proceeds to step S48 and calculates the estimated value NY of the rotational speed N of the crank 28 of the bicycle 10 for a case where the transmission ratio R is changed to a transmission ratio R that is one step higher than the transmission ratio R that is presently set. More specifically, the electronic controller 62 calculates the estimated value NY using at least one of a map, a table, and an equation stored beforehand in the memory device 64 and indicating the relationship of changes in the transmission ratio R with respect to the estimated value NX. The map, the table, and the equation indicating the relationship of changes in the transmission ratio R with respect to the estimated value NY can each include parameters such as the vehicle speed V and the human drive force TA. Then, in step S49, the electronic controller 62 determines whether or not the estimated value NY is greater than or equal to the fourth rotational speed N4.

In a case where the electronic controller 62 determines in step S49 that the estimated value NY is greater than or equal to the fourth rotational speed N4, the electronic controller 62 proceeds to step S50 and controls the transmission 42 to change the transmission ratio R to a transmission ratio R that is one step higher. Then, the electronic controller 62 ends processing. In a case where the electronic controller 62 determines in step S49 that the estimated value NY is less than the fourth rotational speed N4, the electronic controller 62 ends processing without changing the transmission ratio R.

In a case where the electronic controller 62 determines in step S46 that the human drive force TA is greater than the second value TA2, the electronic controller 62 ends processing. In a case where a negative determination is made in step S41 and a negative determination is made in step S46 indicating that the human drive force TA is in a range less than the first value TA1 and greater than the second value TA2, the transmission ratio R is not changed.

Modifications

The description related with the above embodiments exemplifies, without any intention to limit, an applicable form of a bicycle control device according to the present invention. A bicycle control device according to the present invention is applicable to, for example, modifications of the above embodiments that are described below and combinations of at least two of the modifications that do not contradict each other. In the modifications described hereafter, same reference numerals are given to those components that are the same as the corresponding components of the above embodiment. Such components will not be described in detail.

In the first embodiment, steps S26 to S30 can be omitted from the control for changing the transmission ratio R shown in FIG. 4. In this case, the electronic controller 62 ends processing if the electronic controller 62 determines in step S21 that the output torque TX is less than the first torque TX1. In the first embodiment, steps S21 to S25 can be omitted from the control for changing the transmission ratio R shown in FIG. 4.

Figure 6:
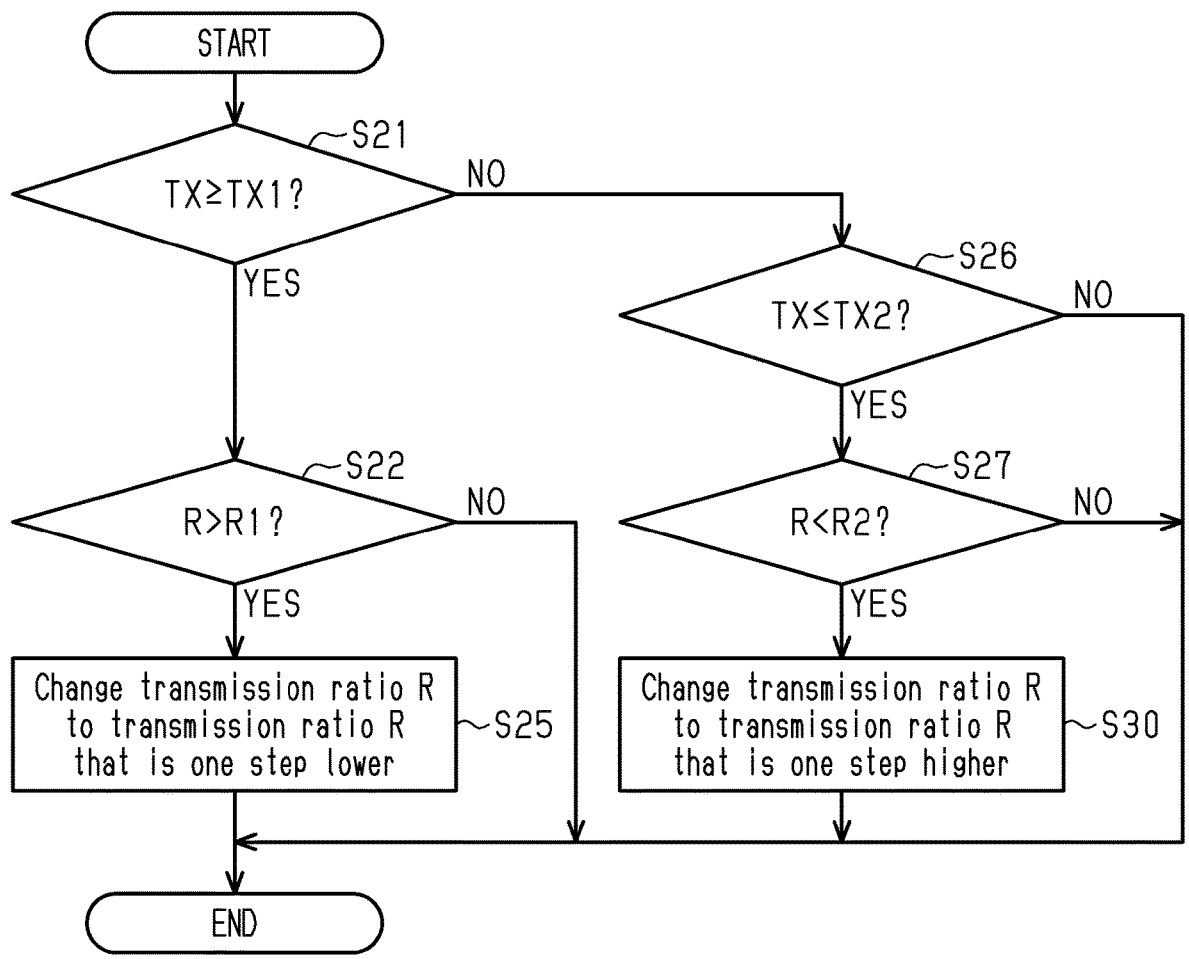
FIG. 6 is a flowchart of a modified control executed by an electronic controller to change the transmission ratio.

In the first embodiment, steps S23, S24, S28 and S29 can be omitted from the control for changing the transmission ratio R shown in FIG. 4. More specifically, as shown in FIG. 6, in a case where the electronic controller 62 determines in step S22 that the transmission ratio R is greater than the first transmission ratio R1, the electronic controller 62 proceeds to step S25 and controls the transmission 42 to change the transmission ratio R to a transmission ratio R that is one step lower. Then, the electronic controller 62 ends processing. In a case where the electronic controller 62 determines in step S22 that the transmission ratio R is less than or equal to the first transmission ratio R1, the electronic controller 62 ends processing without changing the transmission ratio R. In a case where the electronic controller 62 determines in step S21 that the output torque TX is less than the first torque TX1, the electronic controller 62 proceeds to step S26. In a case where the electronic controller 62 determines in step S26 that the output torque TX of the motor 46 is less than or equal to the second torque TX2 and determines in step S27 that the transmission ratio R is less than the second transmission ratio R2, the electronic controller 62 proceeds to step S30. The electronic controller 62, in step S30, controls the transmission 42 to change the transmission ratio R to a transmission ratio R that is one step higher. Then, the electronic controller 62 ends processing.

In the first embodiment, steps S23 and S24 can be omitted from the control for changing the transmission ratio R shown in FIG. 4. Alternatively, in the first embodiment, steps S28 and S29 can be omitted from the control for changing the transmission ratio R shown in FIG. 4.

Steps S26, S27 and S30 can be omitted from the modified example shown in FIG. 6. In this case, the electronic controller 62 ends processing if the electronic controller 62 determines in step S21 that the output torque TX is less than the first torque TX1. Steps S21, S22 and S25 can be omitted from the modified example shown in FIG. 6.

In the second embodiment, steps S43, S44, S48 and S49 can be omitted from the control for changing the transmission ratio R shown in FIG. 5. Alternatively, steps S43 and S44 can be omitted. As another option, steps S48 and S49 can be omitted.

In the second embodiment, steps S46 to S50 can be omitted from the control for changing the transmission ratio R shown in FIG. 5. In this case, the electronic controller 62 ends processing if the electronic controller 62 determines in step S41 that the human drive force TA is less than the first value TA1. In this case, steps S43 and S44 can also be omitted.

In the second embodiment, steps S41 to S45 can be omitted from the control for changing the transmission ratio R shown in FIG. 5. In this case, steps S48 and S49 can also be omitted.

In the second embodiment, steps S43, S44 and S46 to S50 can be omitted from the control for changing the transmission ratio R shown in FIG. 5. In the second embodiment, steps S41 to S45 and S48 to S49 can be omitted from the control for changing the transmission ratio R shown in FIG. 5.

In each embodiment, the control for changing the predetermined ratio AX shown in FIG. 3 can be omitted. In this case, the electronic controller 62 can change the predetermined ratio AX in correspondence with only an operation input to the operation unit 50.

What is claimed is:
1. A bicycle control device comprising:
an electronic controller configured to control a transmission configured to change a transmission ratio of a bicycle and a motor that assists propulsion of the bicycle,
the electronic controller being configured to control the motor so that a ratio of an assist force generated by the motor to a human drive force inputted to the bicycle is maintained equal to a predetermined ratio, and
the electronic controller being configured to control the transmission in correspondence with at least one of an output torque of the motor and the human drive force to maintain the predetermined ratio, the electronic controller configured to not change the transmission ratio when it determines that the ratio can be maintained equal to the predetermined ratio by controlling the motor.

2. A bicycle control device comprising:
an electronic controller configured to control a transmission configured to change a transmission ratio of a bicycle and a motor that assists propulsion of the bicycle,
the electronic controller being configured to control the motor so that a ratio of an assist force generated by the motor to a human drive force inputted to the bicycle is maintained equal to a predetermined ratio, and
the electronic controller being configured to control the transmission in correspondence with at least one of an output torque of the motor and the human drive force to maintain the predetermined ratio, the electronic controller controlling the transmission to raise the transmission ratio upon determining the output torque of the motor is less than or equal to a second torque.

3. The bicycle control device according to claim 1, wherein
the electronic controller is configured to control the transmission to lower the transmission ratio upon determining the human drive force is greater than or equal to a first value.

4. The bicycle control device according to claim 3, wherein
the electronic controller is configured to control the transmission to lower the transmission ratio upon determining the human drive force is greater than or equal to a first value and a third predetermined condition is satisfied in relation with a rotational speed of the crank of the bicycle.

5. The bicycle control device according to claim 3, wherein
the electronic controller is configured to control the transmission to lower the transmission ratio upon determining the human drive force is greater than or equal to the first value and the transmission ratio is presently greater than a third transmission ratio.

6. The bicycle control device according to claim 3, wherein
the electronic controller is configured to control the transmission to raise the transmission ratio upon determining the human drive force is less than or equal to a second value that is less than the first value.

7. The bicycle control device according to claim 6, wherein
the electronic controller is configured to control the transmission to raise the transmission ratio upon determining the human drive force is less than or equal to the second value and a fourth predetermined condition is satisfied in relation with a rotational speed of the crank of the bicycle.

8. The bicycle control device according to claim 6, wherein
the electronic controller is configured to control the transmission to raise the transmission ratio upon determining the human drive force is less than or equal to the second value and the transmission ratio is presently less than a fourth transmission ratio.

9. The bicycle control device according to claim 1, wherein
the electronic controller is configured to control the transmission to raise the transmission ratio upon determining the human drive force is less than or equal to a second value.

10. The bicycle control device according to claim 1, wherein
the electronic controller is configured to change the predetermined ratio in correspondence with a travel state of the bicycle.

11. The bicycle control device according to claim 10, further comprising
a memory device that stores the travel state which includes at least one of the human drive force, a rotational speed of a crank of the bicycle, a vehicle speed of the bicycle, an acceleration of the bicycle, an inclination angle of the bicycle, a wind velocity, a road surface resistance and a travel resistance.

12. The bicycle control device according to claim 1, wherein
the electronic controller determines that the ratio can be maintained equal to the predetermined ratio by controlling the motor when the output torque of the motor is within a range defined by a first torque and a second torque that is smaller than the first torque.

13. The bicycle control device according to claim 1, wherein
the electronic controller determines that the ratio can be maintained equal to the predetermined ratio by controlling the motor when the human drive force is within a range defined by a first value and a second value that is smaller than the first value.

14. A bicycle control device comprising:
an electronic controller configured to control a transmission configured to change a transmission ratio of a bicycle and a motor that assists propulsion of the bicycle,
the electronic controller being configured to control the motor so that a ratio of an assist force generated by the motor to a human drive force inputted to the bicycle becomes equal to a predetermined ratio, and
the electronic controller being configured to control the transmission in correspondence with an output torque of the motor to maintain the predetermined ratio, the electronic controller being configured to control the transmission to lower the transmission ratio upon determining the output torque of the motor is greater than or equal to a first torque.

15. The bicycle control device according to claim 14, wherein
the electronic controller is configured to control the transmission to lower the transmission ratio upon determining the output torque of the motor is greater than or equal to the first torque and a first predetermined condition is satisfied in relation with a rotational speed of a crank of the bicycle.

16. The bicycle control device according to claim 15, wherein
the transmission is configured to change the transmission ratio in steps, and
the electronic controller is configured to determine that the first predetermined condition is satisfied if an estimated value of the rotational speed of the crank of the bicycle is less than or equal to a predetermined first rotational speed for a case where the transmission ratio is changed to a transmission ratio that is one step lower than that is presently set.

17. The bicycle control device according to claim 14, wherein
the electronic controller is configured to control the transmission to lower the transmission ratio upon determining the output torque of the motor is greater than or equal to the first torque and the transmission ratio is presently greater than a first transmission ratio.

18. The bicycle control device according to claim 14, wherein
the electronic controller is configured to control the motor so that the output torque of the motor does not become greater than or equal to an upper limit torque that is greater than the first torque.

19. The bicycle control device according to claim 14, wherein
the electronic controller is configured to control the transmission to raise the transmission ratio upon determining the output torque of the motor is less than or equal to a second torque that is less than the first torque.

20. The bicycle control device according to claim 19, wherein
the electronic controller is configured to control the transmission to raise the transmission ratio the output torque of the motor is less than or equal to the second torque and a second predetermined condition is satisfied in relation with a rotational speed of a crank of the bicycle.

21. The bicycle control device according to claim 20, wherein
the transmission is configured to change the transmission ratio in steps, and
the electronic controller is configured to determine that the second predetermined condition is satisfied if an estimated value of the rotational speed of the crank of the bicycle is greater than or equal to a predetermined second rotational speed for a case where the transmission ratio is changed to a transmission ratio that is one step higher than the transmission ratio that is presently set.

22. The bicycle control device according to claim 19, wherein
the electronic controller is configured to control the transmission to raise the transmission ratio upon determining the output torque of the motor is less than or equal to the second torque and the transmission ratio is presently less than a second transmission ratio.

23. The bicycle control device according to claim 19, wherein the electronic controller is configured to control the motor so that the output torque of the motor does not become less than or equal to a lower limit value that is less than the second torque.

24. A bicycle control device comprising:
an electronic controller configured to control a transmission configured to change a transmission ratio of a bicycle and a motor that assists propulsion of the bicycle, the transmission being configured to change the transmission ratio in steps,
the electronic controller being configured to control the motor so that a ratio of an assist force generated by the motor to a human drive force inputted to the bicycle becomes equal to a predetermined ratio,
the electronic controller being configured to control the transmission in correspondence with the human drive force to maintain the predetermined ratio,
the electronic controller being configured to control the transmission to lower the transmission ratio upon determining that the human drive force is greater than or equal to a first value and that a third predetermined condition is satisfied in relation with a rotational speed of the crank of the bicycle, and
the third predetermined condition being satisfied when an estimated value of the rotational speed of the crank of the bicycle is less than a predetermined third rotational speed, the electronic controller calculating the estimated value as an estimate of the rotational speed for a case where the transmission ratio is changed to a transmission ratio that is one step lower than the transmission ratio that is presently set.

25. A bicycle control device comprising:
an electronic controller configured to control a transmission configured to change a transmission ratio of a bicycle and a motor that assists propulsion of the bicycle,
the electronic controller being configured to control the motor so that a ratio of an assist force generated by the motor to a human drive force inputted to the bicycle becomes equal to a predetermined ratio,
the electronic controller being configured to control the transmission in correspondence with the human drive force to maintain the predetermined ratio, the transmission being configured to change the transmission ratio in steps,
the electronic controller being configured to control the transmission to lower the transmission ratio upon determining the human drive force is greater than or equal to a first value,
the electronic controller being configured to control the transmission to raise the transmission ratio upon determining that the human drive force is less than or equal to a second value, the second value being less than the first value, and that a fourth predetermined condition is satisfied in relation with a rotational speed of the crank of the bicycle, and
the fourth predetermined condition being satisfied when an estimated value of the rotational speed of the crank of the bicycle is greater than or equal to a predetermined fourth rotational speed, the electronic controller calculating the estimated value as an estimate of the rotational speed for a case where the transmission ratio is changed to a transmission ratio that is one step higher than the transmission ratio that is presently set.

* * * * *